Nov. 3, 1953   H. S. FORSBERG   2,657,719
ADJUSTABLE POWER-DRIVEN CIRCULAR SAW
Filed Feb. 6, 1951   2 Sheets-Sheet 1

INVENTOR.
HAROLD S. FORSBERG
BY
ATTORNEY

Nov. 3, 1953            H. S. FORSBERG            2,657,719
ADJUSTABLE POWER-DRIVEN CIRCULAR SAW
Filed Feb. 6, 1951            2 Sheets-Sheet 2
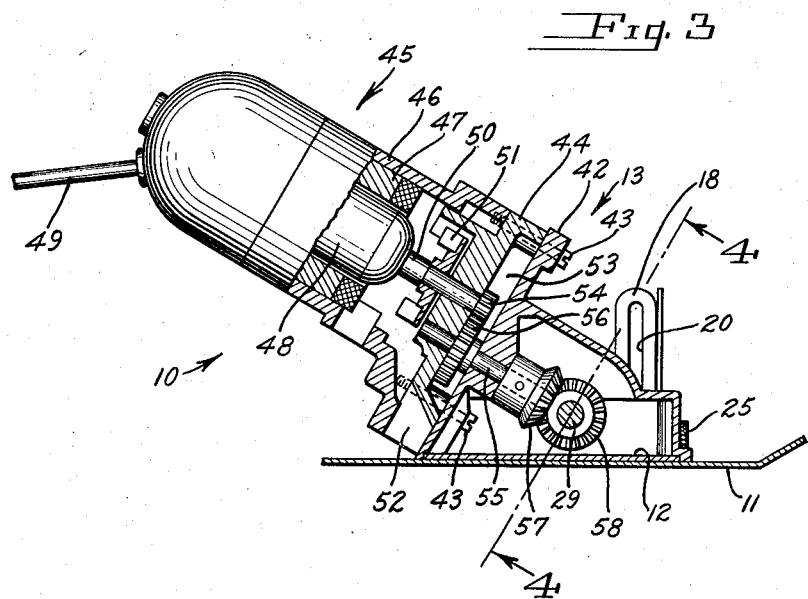
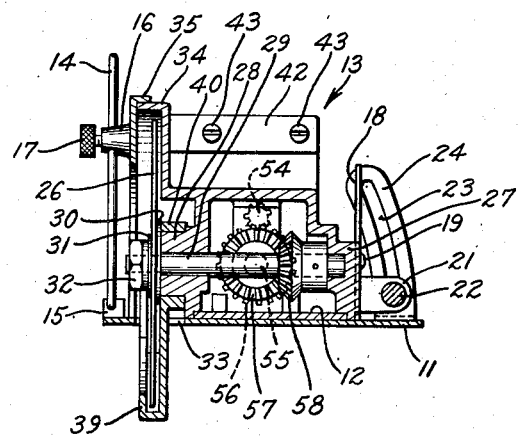
INVENTOR.
HAROLD S. FORSBERG
BY
*John H. Hanrahan*
ATTORNEY Patented Nov. 3, 1953

2,657,719

UNITED STATES PATENT OFFICE 2,657,719

ADJUSTABLE POWER-DRIVEN CIRCULAR SAW

Harold S. Forsberg, Shelton, Conn.

Application February 6, 1951, Serial No. 209,569

2 Claims. (Cl. 143—43)

This invention relates to new and useful improvements in hand tools and has particular relation to a power driven circular hand saw.

An object of the invention is to provide a portable or hand manipulatable power driven circular saw wherein a base or gage plate is adjustable relative to the saw blade for determining the depth of cut and the angle of cut to be made and also wherein the casing of the driving motor comprises a handle for use in manipulating the saw and is located with its center line considerably above the center line of the shaft mounting the circular saw and is geared to such shaft through an intermediate or jack shaft whereby said handle is located at a convenient angle for use and yet at such angle that the hand gripping the motor casing as a handle is clear of the work being cut.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 3 is a view partly in side elevation but for the most part in central longitudinal section of the saw of the invention; and Fig. 4 is a sectional view taken as along the plane of the line 4—4 of Fig. 3.

Figure 1:
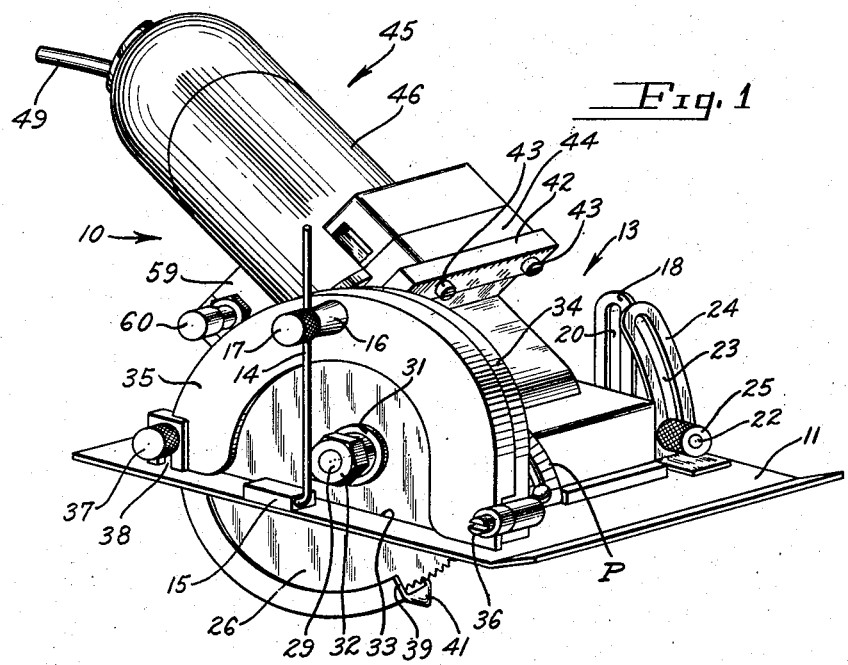
Fig. 1 is a perspective view showing the power driven circular hand saw of the invention.
Figure 2:
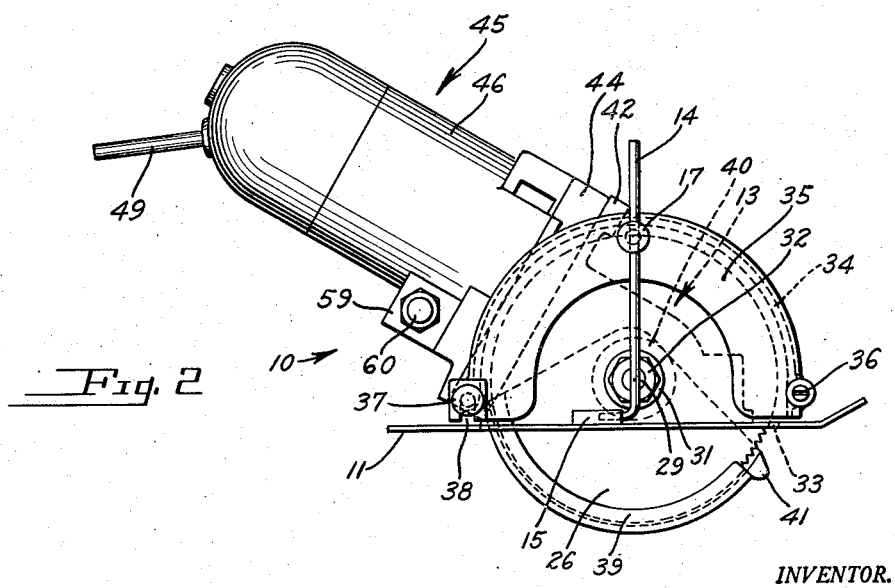
Fig. 2 is a side elevational view thereof.

Referring in detail to the drawings, at 10 is generally designated my improved power operated circular hand saw and the same comprises a gage or base plate 11 having a flat under side and in its illustrated position located against the bottom cover plate 12 of a body 13. Gage plate 11 is adjustable outwardly from or downwardly from the bottom of the body 13 for determining the depth of a cut which will be made and is also adjustable into an angular relation with the body for determining the angle of a cut which will be made.

To the desired end, a rod 14 connected with a portion of the plate 11, as at 15, has its upper end slidably passing through a spud 16. A screw 17 is used to secure the rod in the desired vertical relation to the spud 16 and thus to secure that edge portion of the plate 11 with which the rod is connected in the desired relation to the saw.

A pair of members 18, located in ways or grooves (not shown), are secured against the opposite side of the body 13 by screws 19 and such members are vertically slotted, as at 20, and it is through these slots that the screws 19 pass.

Members 18 carry outwardly projecting ears 21 through which pass a bar 22 whereby the bar is attached to the members 18 and thus to the body 13. The bar 22 also passes through arcuate slots 23 in a pair of members 24 located in planes normal to those of the members 18 and at their lower ends rigid with plate 11. On the outer ends of the bar 22 are nuts 25. On loosening of these nuts the side of the gage plate having the arcuately slotted members 24 fixed thereto may be shifted relative to the underside of the body 13.

In such an adjustment, the gage plate 11 will pivot on its connection at 15 with the lower end of the rod 14 and thus be angularly disposed relative to the body 13 and the circular saw 26, which is at one side of such body, and normal to the bottom closure 12 thereof. Such an adjustment will be used when a bevelled cut is to be made by the saw. The extent of the adjustment or the angle of adjustment may readily be determined by a reading on the protractor P (Fig. 1).

Loosening of the screws 19 provides for an adjustment of the gage plate 11 from and toward body 13 in the same manner that loosening of the screw 17 provides for such an adjustment at its side of the body whereby the gage plate may be maintained parallel with the underside of the body but spaced therefrom to provide for the making of a shallow cut by the saw blade 26.

Rotatably mounted as by bearings 27 and 28 of the body and located parallel with the bottom closure member 12 is a blade carrying shaft 29. As shown in Fig. 4, body 13 comprises a hollow portion including spaced side walls which include the bearings 27 and 28. Shaft 29 extends entirely through the bearing member 28 and at the outer side thereof mounts the blade 26, the latter being located between washers 30 and 31 and held in place by a nut 32 threaded onto the outer end of the shaft. The shaft 29 is located in only slightly spaced relation to the body bottom closure plate 12 and the gage plate 11 is slotted as at 33 and the circular saw 26 extends through such opening.

Body 13 includes an upwardly extending housing portion 34 which together with an arcuate piece 35 comprising substantially more than one-half of a circle, encloses and guards that portion of the blade 26 located above the gage plate 11. Guard portion 34 is an integral part of the body 13 and the arcuate member 35 is shown as secured to the portion 34 by screws 36 and 37, the latter of which passes through an open ended slot 38 in the member 35.

Below the gage plate a retractable guard 39 normally assumes a position enclosing the greater part of the lower portion of the blade 26. This retractable guard 39 includes a portion 40 rotatable on the outer part of the hub-like bearing member 28 (Fig. 4) and further includes a leading portion 41. During a sawing operation the leading edge of the gage plate 11 is entered onto the piece to be sawed and as the saw is advanced guard portion 41 engages the work and as the saw continues to advance, the guard portion 39 is caused to rock in a clockwise direction about the extended portion of the bearing member 28 permitting the saw to enter the work.

Body 13, in addition to the parts described, is considered as including a rear wall 42 through the upper portion of which pass screws 43 attaching a body portion 44, which latter has a small electric motor 45 fixed thereto. Actually, it is the casing 46 of the motor that is fixed to the body portion 44. The motor 45, in addition to the casing 46, includes a field 47 and a rotor 48. Power for the motor is furnished as through a flexible lead 49, the outer end of which is provided with a plug cap (not shown).

On the shaft 50 of motor 45 is fixed a small blower 51 providing a current of air over the coils and through the housing or body of the saw there is a passage having an entrance 52 for the entrance of air as required by the blower. The casing 46 of the motor 45 provides a handle by means of which the saw 10 is manipulated and it is desirable that this handle be at a convenient angle, of approximately thirty degrees, to the gage plate 11 and yet be in such position that an operator's hand holding onto the casing 46 will not come in contact with work. Additionally, it is necessary that the structure be kept simple and, as far as possible, of light weight since the whole tool is portable and adapted to be manually carried about and manually manipulated during use.

The shaft 50 of motor 45 is concentric with handle 46 and extends through the body portion 44 into a chamber 53 between the wall 42 of the body and the wall portion 44 thereof. Within the space 53 a gear 54 is fixed to the motor shaft 50. Then a jack shaft 55 is mounted by the body walls 42 and in a position below but parallel with and overlapping the lower end portion of the motor shaft 50. This jack shaft extends through the recess or space 53 and has bearings in adjacent body portions and within said space has fixed thereto a gear 56 meshing with the motor shaft carried gear 54.

Jack shaft 55 extends into the aforementioned hollow body portion, i. e., between the walls carrying the bearings 27 and 28, and within such space has fixed thereto a bevelled gear 57 constantly meshing with a bevelled gear 58 fixed onto the circular saw mounting shaft 29. A switch 59 is conveniently located and controls the supply of power to the motor 45.

When the saw is to be used, switch 59 is closed by manipulation of the manual or button 60 and remains closed until the button is again manipulated. Motor shaft 50 drives gear 54 which constantly meshing with the gear 56 results in a driving of the jack shaft 55 and through the bevelled gears 57 and 58, the shaft 29 and thus the circular saw 26.

The gage plate 11, having been adjusted into the desired relation with the closure plate 12, is placed against the top surface of a board at the edge thereof and the lead 41 of retractable guard 39 engages the edge of the board and as the saw is advanced the retractable guard is pushed or forced in a clockwise direction about the aforementioned hub of the bearing 28. While the motor 45 is driving the shaft 29 of blade 26 through bevelled gearing, and said shaft 29 is located only a short distance above the uppermost position of the gage plate 11, the handle comprising the casing 46 of the motor is elevated considerably above the plane of gage plate 11 and thus the operator's hand is not likely to come in contact with any work or projections on the work.

Especially is it noted that the handle is located at a relatively shallow and convenient angle with respect to the plane of plate 11 and yet has ample clearance from the plate. This is accomplished by the interposition of the jack shaft 55 carrying the bevelled gear meshing with the bevelled gear of shaft 29. Thus, the jack shaft permits of the motor being located considerably above the plate 11 to provide clearance for the hand of the operator and yet at a relatively shallow angle to the plate and to have a bevelled gear drive with the shaft of the circular saw.

It is also noted that the gears are well enclosed or housed and thus are, in effect, within chambers which may contain a relatively large quantity of heavy grease and thus the mechanism is adapted for use over a long period of time without attention to lubrication. Generally, the operator will be grasping the handle (motor casing) 46 in one hand and will be standing back of the saw. With the handle located entirely rearwardly of the saw shaft 29 and at the shallow yet convenient angle described, the operator has a clear view of location of the circular saw relative to the work or the cut being made.

Having thus set forth the nature of my invention, what I claim is:

1. In a power operated circular hand saw, a body, a shaft rotatably mounted on said body, a circular saw blade on said shaft at one side of said body, a motor secured to said body, a drive from said motor to said shaft for driving said circular saw blade, a gage plate at the under side of said body and extending beyond the front and side edges thereof and having a slot through which said blade extends, an arcuate guard secured to said body enclosing the outer side of that portion of said blade located above the gage plate, a vertical rod outwardly of said guard substantially normal to and intersecting the axis of said blade, a rod support on said guard having a vertical passage in which said rod is slidably adjustable vertically relative to said body, a hinged connection between the lower end of said rod and said gage plate, a pair of members respectively forwardly and rearwardly of the axis of said blade at the other side of said body and slidably adjustable vertically thereon, and means attaching the lower end of said members to said gage plate whereby the latter may be adjusted toward and from the lower side of said body.

2. In a power operated circular hand saw, a body, a shaft rotatably mounted on said body, a circular saw blade on said shaft at one side of said body, a motor secured to said body and extending rearwardly therefrom providing a handle by which said body may be manipulated, a drive from said motor to said shaft for driving said circular saw blade, a gage plate at the under side of said body and extending beyond the front and side edges thereof and having a slot through which said blade extends, an arcuate guard secured to said body enclosing the outer side of that portion of said blade located above the gage plate, a vertical rod outwardly of said guard substantially normal to and intersecting the axis of said blade, a rod support on said guard having a vertical passage in which said rod is slidably adjustable vertically relative to said body, a hinged connection between the lower end of said rod and said gage plate, a pair of members respectively forwardly and rearwardly of the axis of said blade at the other side of said body and slidably adjustable vertically thereon, a pair of arcuately slotted members fixed to said gage plate at said other side of said body respectively forwardly and rearwardly of the axis of said blade, means adjustable in the slots of said slotted members, and pivotally connecting the lower ends of the first members thereto whereby said gage plate may be adjusted toward and from the lower side of said body and may also be adjusted to angular relation thereto by downward adjustment of the arcuately slotted members relative to the means in their slots and hinge movement of said plate on the hinged connection with the lower end of said rod.

HAROLD S. FORSBERG.

References Cited in the file of this patent

UNITED STATES PATENTS

| Number | Name | Date |
|---|---|---|
| 1,734,406 | Strand | Nov. 5, 1929 |
| 1,803,068 | McKeage | Apr. 28, 1931 |
| 1,833,785 | Krieger | Nov. 24, 1931 |
| 1,858,459 | Ramey | May 17, 1932 |
| 1,900,553 | Hampton | Mar. 7, 1933 |
| 1,932,511 | Clarke | Oct. 31, 1933 |
| 2,155,082 | Decker | Apr. 18, 1939 |
| 2,427,580 | Stryker | Sept. 16, 1947 |